United States Patent
Grosspietsch et al.

[11] Patent Number: 5,806,646
[45] Date of Patent: Sep. 15, 1998

[54] FRICTION CLUTCH WITH MECHANICALLY-OPERATED CONCENTRIC DISENGAGEMENT DEVICE

[75] Inventors: Wolfgang Grosspietsch, Schweinfurt; Thomas Otto, Gochsheim; Thomas Walter, Kolitzheim; Ulrich Husse, Schweinfurt, all of Germany

[73] Assignee: Fichtel & Sachs AG, Schweinfurt, Germany

[21] Appl. No.: 706,791

[22] Filed: Sep. 3, 1996

[30] Foreign Application Priority Data

Sep. 2, 1995 [DE] Germany ............ 195 32 509.5

[51] Int. Cl.[6] ............ F16D 13/75; F16D 23/14
[52] U.S. Cl. ............ 192/70.25; 192/89.21; 192/89.23; 192/110 B
[58] Field of Search ............ 192/70.23, 70.25, 192/89.21, 89.23, 93 A, 94, 98, 110 B

[56] References Cited

U.S. PATENT DOCUMENTS

| 1,121,172 | 12/1914 | De Wald | 192/94 X |
| 1,967,563 | 7/1934 | Russell | 192/70.23 X |
| 2,008,967 | 7/1935 | Rossman | 192/94 X |
| 3,724,620 | 4/1973 | Benson | 192/70.23 |
| 3,841,454 | 10/1974 | Pionte | 192/89.21 X |
| 4,865,173 | 9/1989 | Leigh-Monstevens et al. | 192/94 X |
| 4,934,503 | 6/1990 | Bacher et al. | 192/93 A |
| 5,141,091 | 8/1992 | Perez et al. | 192/93 A |
| 5,669,480 | 9/1997 | Kooy et al. | 192/89.21 |

FOREIGN PATENT DOCUMENTS

| 3940917 | 6/1991 | Germany . |
| 4306688 | 11/1993 | Germany . |
| 2237350 | 5/1991 | United Kingdom . |
| 2281949 | 3/1995 | United Kingdom . |
| 2296748 | 7/1996 | United Kingdom . |

Primary Examiner—Rodney H. Bonck
Attorney, Agent, or Firm—Cohen, Pontani, Lieberman, Pavane

[57] ABSTRACT

A friction clutch with a mechanically-operated disengagement device that includes two elements that can be turned relative to one another, which are arranged concentric to the rotational axis and are supported on the clutch housing, on the one hand, and on the operating elements of the friction clutch on the other. These two elements are connected to the clutch pedal with a cable, on the one hand, and with a sheath, on the other.

19 Claims, 3 Drawing Sheets

FRICTION CLUTCH WITH MECHANICALLY-OPERATED CONCENTRIC DISENGAGEMENT DEVICE

BACKGROUND OF THE INVENTION

1. Field of the Invention

The invention relates to a friction clutch, and more particularly to a friction clutch for the drive train of a motor vehicle. Such a clutch includes spring means for gripping a clutch disk between a pressure plate and a counterpressure plate, whereby the pressure plate is run in a clutch housing in a rotation-proof but axially movable manner and whereby these parts define a rotational axis. Operating means are provided for lifting the pressure plate counter to the force of the spring means. A disengagement device is arranged concentric to the rotational axis for operating the operating means, which is axially supported on the clutch housing on the one hand and on the operating means on the other. A ramp arrangement is arranged inside of the disengagement device for the axial movement of two roller bearings, one of which is located between the ramp arrangement and the operating means and the other of which is located between the ramp arrangement and the clutch housing.

2. Description of the Related Art

A friction clutch of this type is known, for example, from the German document DE OS 39 40 917. This clutch has a hydraulically-operable disengagement system, wherein the disengagement device is arranged concentric to the rotational axis and is supported via two roller bearings on the clutch housing, on the one hand, and on the operating means of the friction clutch, on the other. A hydraulic disengagement device of this type, if it is to function properly, is very expensive. Among other reasons, this is because the disengagement device is arranged concentric to the transmission shaft, requires a hydraulic pressure line for the input system and thus cannot simply be disassembled when repairs are needed.

SUMMARY OF THE INVENTION

The object of the present invention is to provide a friction clutch that is reliable in operation and handles easily during assembly, disassembly and repair.

Pursuant to this object, and others which will become apparent hereafter, one aspect of the present invention resides in a friction clutch having a ramp arrangement comprised of at least two components which are axially movable relative to one another and which can be operated via a cable-sheath system. The use of a mechanical disengagement system which can be operated via a cable and sheath and is supported on the inner side of the clutch housing makes it possible to integrate the disengagement mechanism into the pressure plate and thus to be less dependent on space availability in the transmission bell. In addition, the direct manner in which the cable and sheath are connected to the disengagement device makes it possible to sharply stem the transmission of vibrations from the disengagement device to the chassis. Because both the cable and the sheath are located on the disengagement device, vibrations of the friction clutch or the crank shaft do not result in relative movements between these parts, which could otherwise be transmitted directly to the clutch pedal.

According to a further embodiment of the invention, the ramp arrangement has two substantially cylindrical components arranged concentric to the rotational axis, which are rotatable relative to one another. The cable is supported on one of these components, and the sheath is supported on the other. Because of their concentric arrangement, the two components of the ramp arrangement can be arranged around the transmission shaft in a space-saving manner.

The two components, which are arranged substantially concentric to one another, can be provided over at least a part of the contact areas facing one another with thread-like engagement contours for the purpose of mutual radial guidance and axial movement. The radially outer component is supported on the clutch housing via a roller bearing, and the inner component is supported on the operating means via a further roller bearing. The thread-like engagement contours of the two components make it possible for the components to be designed very compactly. The association of the radially outer component with the clutch housing and the radially inner component with the operating means results in a very compact structure with short distances for axial force support.

In an especially advantageous embodiment, the two components are provided, in the area of thread-like engagement contours which face one another, with roller bodies similar to a roller body-thread drive. Preferably, balls are used as the roller bodies and, because of the roll-off movement, reduce friction during the operation of the clutch. As a result, it is possible, for example, to operate at low operational forces.

Preferably, the two roller bearings for axial force support between the non-rotating components of the ramp arrangement and the rotating components of the friction clutch are designed as single-row ball bearings. As a result, these bearings are able to transmit axially-directed forces as well as radially-directed forces. The balls, which are arranged in the shape of a ring, of the two ball bearings, respectively, are located substantially concentric to one another and radially atop one another, in order to permit a very compact structural design in the axial direction.

In another embodiment of the invention, each of the components is equipped directly with a ball track of a ball bearing. Because of this, the number of individual parts can be decreased, manufacturing costs can be lowered and the structural space can be reduced. It is further beneficial if the two components extend axially away from the friction clutch, and the cable and sheath are supported in this area—outside of the clutch housing. This makes it possible to easily install the cable and sheath outside of the rotating elements.

In an additional embodiment of the invention, the two components have two substantially washer-shaped areas axially across from one another, which are provided with axial ramps. The respective areas are supported axially via a roller bearing in roughly the same diameter area on the clutch housing or on the operating means respectively and both components end radially inside the roller bearings in cylindrical tube continuation pieces arranged concentric to one another for the purpose of mutual radial guidance. The continuation pieces extend out of the clutch housing directed away from the clutch and are connected there with the cable or sheath. This design can be implemented, for example, using relatively simple sheet-metal parts, into which the ramps are worked by means of plastic deformation. The axial tube continuation pieces are designed as a single part with the washer-shaped areas and constitute a mutual radial guide.

In an advantageous manner, the cable-sheath is arranged substantially swung by 90° relative to the rotational axis and extended out from the disengagement device in a manner roughly tangential to the substantially cylindrical components of the ramp arrangement. Because of this arrangement, vibrations from the motor or transmission, which run mainly in the axial direction, cannot be transmitted to the clutch pedal via the cable-sheath system. This results in a lower transmission of solid-borne sound to the chassis which, in turn, leads to more pleasant driving. It is also essential here that if the cable and sheath vibrate at all, they do so in the same and not in opposite directions.

In still another embodiment the cable and sheath absorb the drag moment of the roller bearings. Once again, the direct support of both the cable and sheath on the components of the ramp arrangement ensures that the two elements are acted upon simultaneously by the drag moment. No interference with clutch operation can result and additional components can thus be dispensed with.

It has proved especially advantageous for a friction clutch of the type under discussion to be provided with a device that compensates for at least the wear of the friction covers of the clutch disk. Such a device is preferably arranged between the operating means and the pressure plate. This device ensures that even as the friction covers of the clutch disk become increasingly worn, the operating means of the friction clutch maintain their position inside the clutch housing. This means that the entire disengagement system needs only to be placed on the required disengagement tracks, without additional wear tracks being necessary. As a result, the entire disengagement system is simpler and more compact.

In another advantageous embodiment of the friction clutch, a spring device is provided for the purpose of reducing the disengagement force. The spring device is supported on an axially fixed component, on the one hand, and on a component of the pressure plate/disengagement system operational chain, on the other. In the engaged state, the spring device exercises no lifting force or only a slight lifting force while, in the disengaged state, it exercises greater lifting force. In this way, it is possible to sharply reduce the disengagement forces that the driver must apply for the friction clutch, as a result of which the entire disengagement system can be kept simple and economical. In addition, the operating distances can be kept small.

Advantageously, the spring device is composed of a cup or diaphragm spring that is arranged between the operating means and the clutch housing and is supported in the area of its external diameter on the inner side of the clutch housing and in the area of its internal diameter on the operating means. Thanks to its design, such a spring device can be manufactured without great expense and can be housed in a space-saving manner.

According to the invention, the clutch housing has two parts. The first part is roughly cup or pot-shaped and is attached by its radially outer lip to the counterpressure plate. The first part accommodates the pressure plate, the operating means and the spring means and has a central opening in the bottom area that is larger than the diameter area for the action of the disengagement device on the operating means. The second part is also substantially pot-shaped in design and its pot lip is attached to the bottom area of the first part. The second part accommodates the disengagement device and with its bottom area constitutes the axial force support for the disengagement device. In most cases, this type of two-part construction of the clutch housing can be manufactured more economically, because the plastic deformation processes can be separated.

According to the invention, the connection of the two housing parts is detachable. This offers the great advantage that the disengagement system can be completely preassembled in the second part of the clutch housing, so that handling is simplified during both assembly and repair work.

Preferably, the connection of the two housing parts can be locked in bayonet fashion so that the connection can be easily detached.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 1a is a longitudinal section of a friction clutch with a disengagement device with axial ramps pursuant to the present invention;

FIG. 1b is a detailed view along arrow A in FIG. 1a;

FIG. 1c is a section along line 1c—1c in FIG. 1a;

DETAILED DESCRIPTION OF THE PRESENTLY PREFERRED EMBODIMENTS

Figure 1:
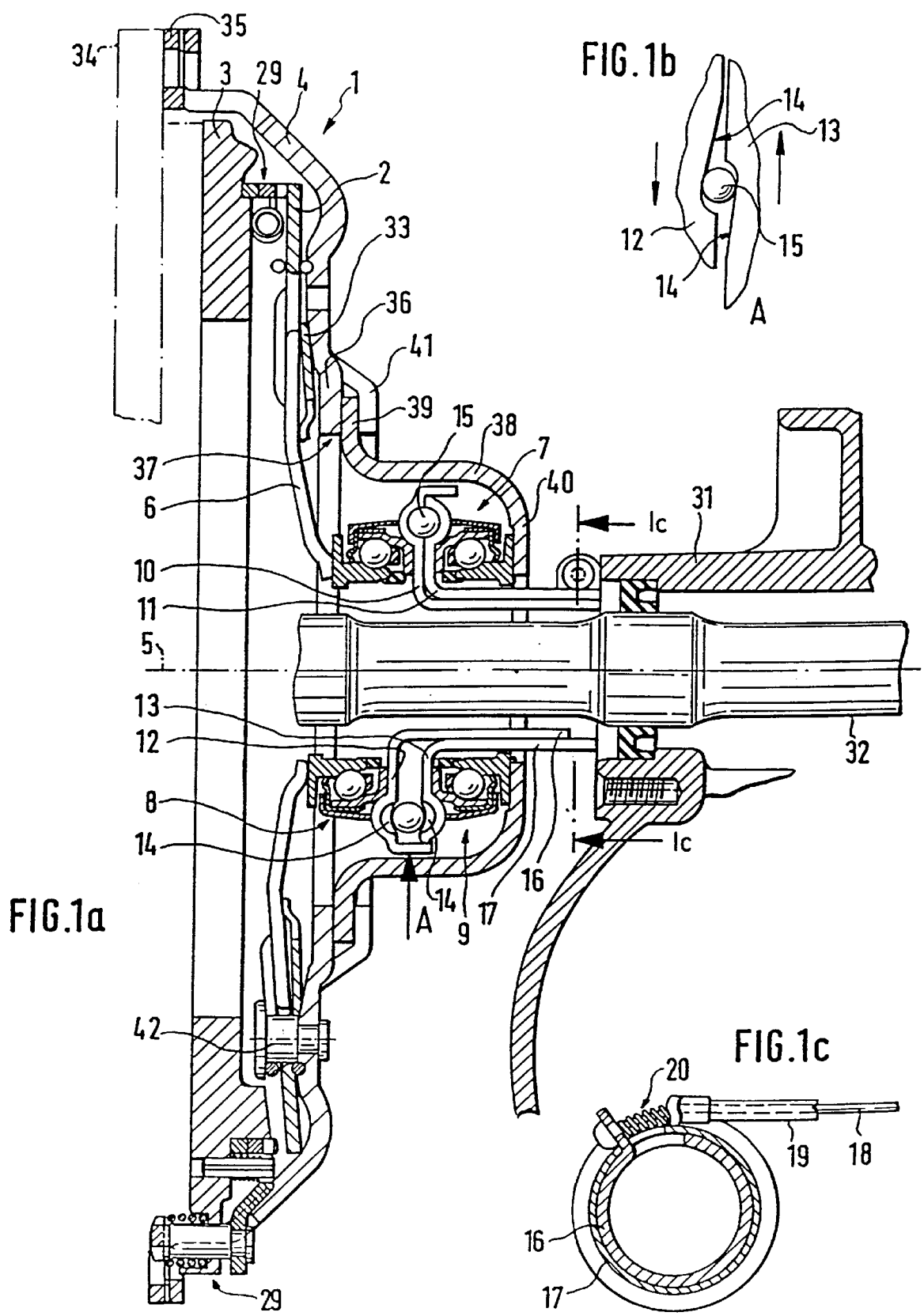

FIG. 1 shows a friction clutch 1, which in the present case is designed as a so-called compressed diaphragm spring clutch. In the clutch housing 4, a diaphragm spring 2 is tilt-mounted over a median diameter, for example, by means of distance bolts 42, and acts with its external diameter upon the pressure plate 3. The spring 2 has flexible tongues 6 that run radially inward and are acted upon by a disengagement system 7. Of course, in principle it is also possible to use, instead of the diaphragm spring 2, a disengagement element—for example, with individual or connected levers—and to arrange a separate spring in order to produce the pressure force. The clutch housing 4 is attached to an indicated counterpressure plate 34, which can be designed as the flywheel of an internal combustion engine.

The pressure plate 3 is connected to the clutch housing 4 in a rotation-proof but axially movable manner by means of elements not described in more detail but known to those skilled in the art. Between the external diameter of the diaphragm spring 2 and the pressure plate 3, there is a device 29 for compensating for the wear of the friction covers of the clutch disk, which device 29 can be gripped axially between the pressure plate 3 and the counterpressure plate 34. Such a wear compensation device is known, for example, from the German document DE-OS 43 06 688. The wear compensation device 29 ensures that throughout the entire useful life of the friction clutch 1, the diaphragm spring 2 maintains its position inside the pressure plate 3, as a result of which the pressure force can also be kept constant and, furthermore, the disengagement system 7 needs only to carry out standard disengagement movements, without requiring additional reserve tracks.

The components connected to the counterpressure plate 34 can rotate around the common rotational axis 5. In contrast, the indicated transmission housing 31 is stationary in the circumferential direction, and the transmission shaft 32 is mounted therein. The transmission shaft 32 extends at least into the space for the clutch disk and there is connected in a rotation-proof manner to the hub of the clutch disk. Between the housing 4 and the flexible tongues 6 of the diaphragm spring 2, there is a cup or diaphragm spring 33, which in the engaged state of the friction clutch 1 exercises little or no lifting force on the diaphragm spring 2 and in the disengaged state exercises greater lifting force. This spring 33 thus allows the disengagement forces that must be applied by the driver to be sharply reduced. As a result, the forces that the driver must apply in order to lift the diaphragm spring are reduced as well.

In the present case, the disengagement device 7 consists of two components 10, 11 of a ramp arrangement, whereby the ramp arrangement also encompasses two ball bearings 8, 9, as well as a connection for a cable 18 and a sheath 19. The components 10,11, respectively, are provided with respective washer-shaped areas 12, 13. As seen in FIG. 1b, both areas 12, 13 are provided with axial ramps 14, which run in the circumferential direction at a slant to a plane vertical relative to the rotational axis 5. Roller bodies, for example, in the form of balls 15, are arranged between the axial ramps 14 axially across from one another. The two washer-shaped areas 12, 13, respectively, are supported via one of the ball bearings 8, 9 either on the clutch housing 4 or on the springs 2. Both components 10, 11 are provided with axially-running tube continuation pieces 16, 17, which extend axially from the clutch housing 4 directed away from the clutch and are designed so that they perform mutual radial guidance.

As shown in FIG. 1c, the two tube continuation pieces 16, 17 are connected to the cable-sheath system 18, 19 so that the clutch pedal (not shown), when operated, can turn the two tube continuation pieces 16, 17 relative to one another. During such operation, the axial ramps 14 of the components 10, 11 rise above one another because of the roller bearing 15 located between them, so that the components 10, 11 execute not only a rotational movement but also an axial movement relative to one another. The support of one component 11 on the clutch housing 4 via the ball bearing 9 and the support of the other component 10 on the flexible tongues of the diaphragm spring 2 via the ball bearing 8 causes a disengagement movement in that the flexible tongues 6 are swung from the clutch housing 4 in the direction of the counterpressure plate 34 and the radially external area of the diaphragm spring 2 is thus moved away from the counterpressure plate 34, allowing the pressure plate 3 to release the clutch disk. In the event of an engagement movement in the opposite direction, the axial ramps 14 and the roller bodies 15 are kept constantly in contact by the force of the diaphragm spring 2, and a spring 20 (shown in FIG. 1c) ensures that the cable 18 is always kept under tensile stress, so that the clutch pedal can be moved back again. Both the cable 18 and the sheath 19 are run tangentially from the tube continuation pieces 16, 17 in a substantially perpendicular fashion relative to the rotational axis 5. As a result, the transmission of vibrations from the friction clutch to the disengagement pedal can be prevented.

The clutch housing 4 in the illustrated embodiment has two parts. The first part 4 is designed in a roughly pot-shaped fashion in the customary manner and is secured via its pot lip 35 to the counterpressure plate 34, for example, by being screwed on. The diaphragm spring 2 is supported on the bottom area 36 of the housing 4, which has a central opening 37 to permit access of the disengagement system 7 to the flexible tongues 6. The second part 38, which is also designed in a substantially pot-shaped manner, is arranged and attached to the first part in the area of the central opening 37. The second part 38 has a pot lip 39, which is secured to the bottom area 36 of the first part 4, and it also has a bottom area 40, which is arranged at an axial distance from the pot lip 39 and directed away from the counterpressure plate 34. The bottom area 40 has a smaller opening than the central opening 37 of the first housing part 4. In the present case, the opening of the bottom area 40 is designed to roughly correspond to the internal diameter area of the flexible tongues 6. The disengagement device 7 is arranged and axially supported between these flexible tongues 6 and the bottom area 40. The two housing parts 4, 38 are preferably connected to one another by a bayonet-type connection, for which purpose the first housing part 4 has axially exposed tabs 41, which are axially exposed across from the bottom area 36 so that the pot lip 39 can be introduced into the space created between them by being turned in the circumferential direction. The two-part design of the clutch housing has the advantage that the two parts can be separately plastically deformed and that the disengagement device is more easily accessible.

Figure 2:
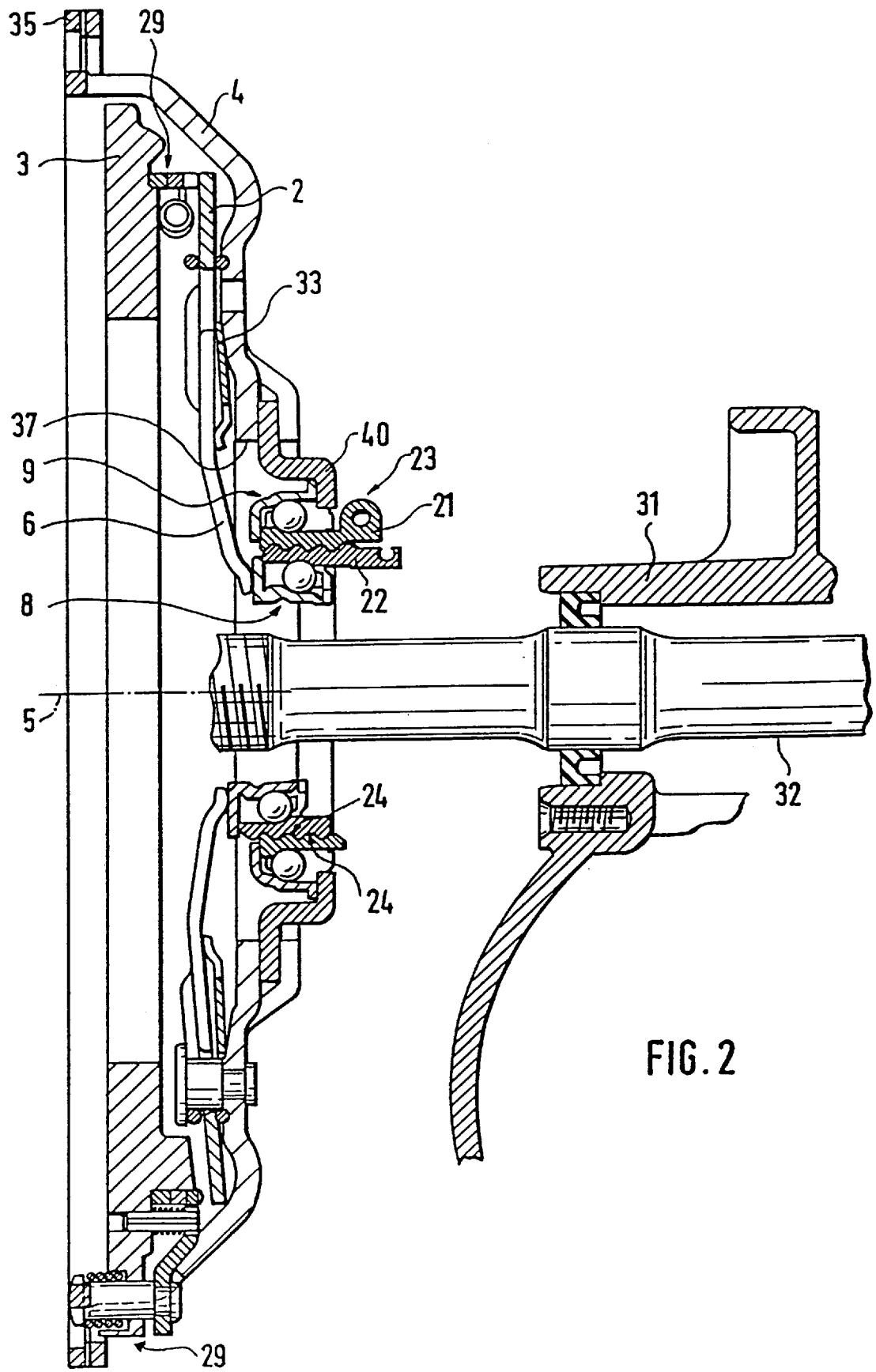
FIG. 2 is a section of a friction clutch with a disengagement device having thread-like engagement contours.
Figure 3:
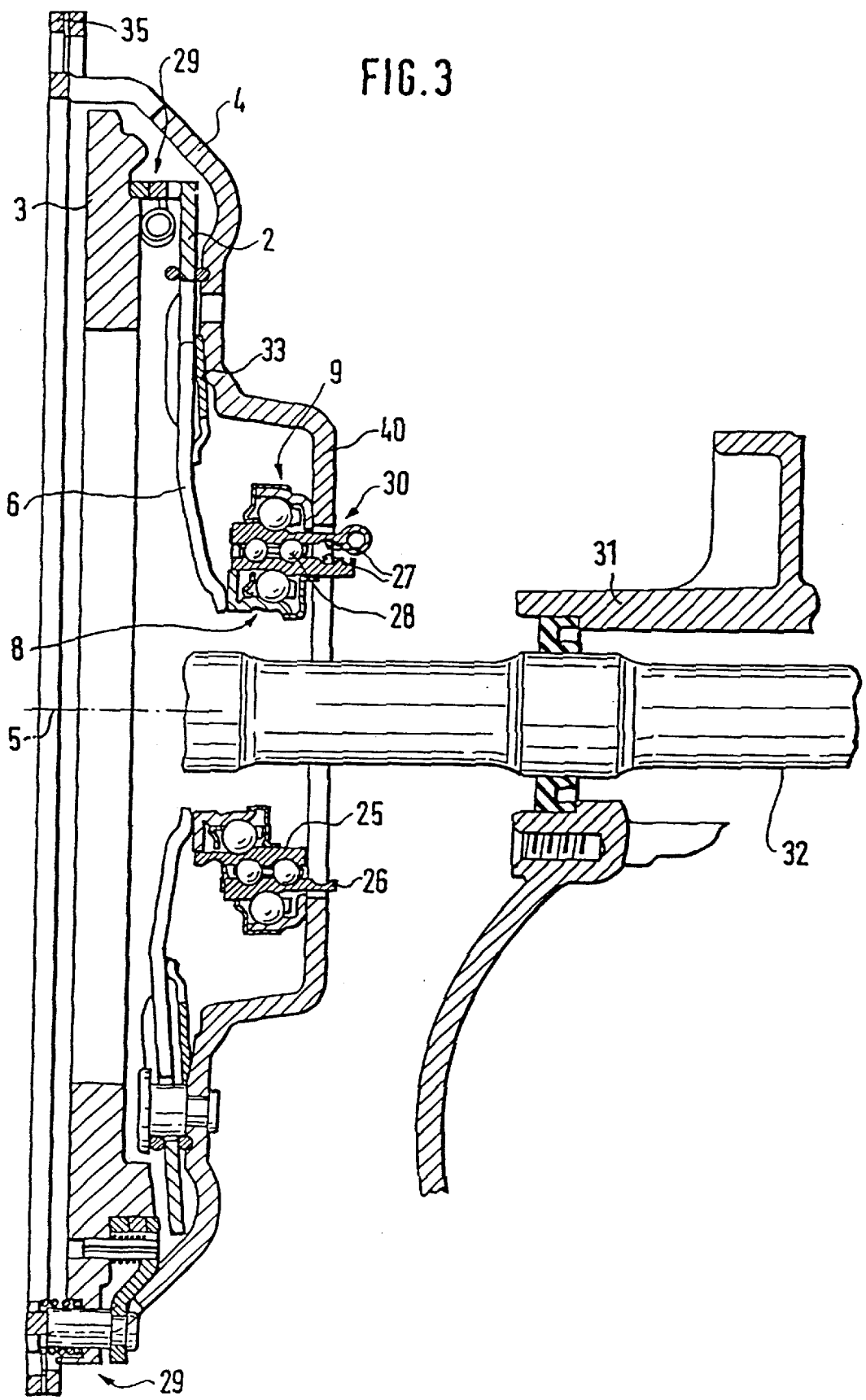
FIG. 3 is a section of a friction clutch with a disengagement device having a ball/thread mechanism.

FIGS. 2 and 3 differ from FIG. 1 mainly in respect to the different embodiments of the disengagement devices 23, 30. These consist, respectively, of two components 21, 22, 25, 26, which are arranged substantially concentric to one another. In FIG. 2, both components 21, 22 have, over at least a portion of their areas facing one another, engagement contours 24, which are embodied in thread-like fashion and which, when the components 21, 22 are turned relative to one another, result in an axial movement. In FIG. 3, the components 25, 26 are kept at a radial distance from one another and have engagement contours 27, which also run in thread-like fashion and which accommodate the roller bodies in the form of balls 28, so that—as in the case of a recirculating ball screw and nut—an axial shift of the two components 25, 26 occurs when they are turned relative to one another. Between the components 21, 26 and the clutch housing 4, a ball bearing 9 is arranged, while between the components 22, 25 and the flexible tongues 6, there is a ball bearing 8. Both ball bearings 8, 9 are arranged substantially radially above one the other and are thus housed in the axial direction in a space-saving manner. Preferably, the components 21, 22; 25, 26 are directly equipped with the track surfaces of the balls. The bearing ring of the ball bearing 9 rests directly on the bottom area 40 of the clutch housing 4, and the bearing ring of the ball bearing 8 rests directly on the flexible tongues 6. In FIG. 2, the clutch housing has a two-part design and is equipped in keeping with FIG. 1, for example, with a bayonet-type lock. In FIG. 3, the clutch housing is formed as one part. The other elements shown in FIGS. 2 and 3 have already been described in connection with FIG. 1.

The designs in FIGS. 2 and 3 can also be used in so-called pulled friction clutches, wherein the distance between the flexible tongue 6 and the clutch housing 40 must be reduced for the purpose of disengagement. To this end, in principle, only the ball bearing 8 needs to grip behind the flexible tongue 6.

The cable-sheath system starting from the disengagement device can naturally be connected to the clutch pedal via a hydraulic operating segment.

The invention is not limited by the embodiments described above which are presented as examples only but can be modified in various ways within the scope of protection defined by the appended patent claims.

We claim:

1. A friction clutch comprising:

a clutch housing;

a pressure plate arranged in the clutch housing in a non-rotatable, axially movable manner;

a counterpressure plate spaced from the pressure plate;

spring means for exerting a force against the pressure plate so that a clutch disk can be gripped between the pressure plate and a counterpressure plate, the pressure plate and the counterpressure plate defining a rotational axis;

operating means for lifting the pressure plate counter to the force of the spring means;

disengagement means arranged concentric to the rotational axis for operating the operating means, the disengagement means being axially supported on the clutch housing and the operating means, the disengagement means including a ramp arrangement, arranged at least partially within the clutch housing;

two roller bearings, a first one of the roller bearings being located between the ramp arrangement and the operating means and a second one of the roller bearings being located between the ramp arrangement and the clutch housing, at least one of the first one and the second one of the roller bearings being axially moveable relative to the other of the first one and the second one of the roller bearings, the ramp arrangement being operative to axially move the roller bearings and including at least two components axially movable relative to one another; and a cable-and-sheath system provided and configured to move the two components.

2. A friction clutch as defined in claim 1, wherein the ramp arrangement includes two substantially cylindrical components arranged concentric to the rotational axis and so as to be turnable relative to one another, the cable-and-sheath system including a cable supported on a first one of the cylindrical components and a sheath supported on a second one of the cylindrical components.

3. A friction clutch as defined in claim 2, wherein the two cylindrical components are arranged substantially concentric to one another and have contact areas that face one another and thread-like engagement contours over at least a part of the contact areas so as to facilitate mutual radial guidance and axial movement, a radially outward one of the components being supported on the clutch housing by the second roller bearing and a radially inward one of the components being supported on the operating means by the first roller bearing.

4. A friction clutch as defined in claim 2, wherein the two cylindrical components are arranged substantially concentric to one another and have areas that face one another and thread-like engagement contours over at least a part of the areas, and further comprising roller bodies arranged between the components in the thread-like engagement contours so as to form a roller-body/thread mechanism.

5. A friction clutch as defined in claim 3, wherein the roller bearings are single-row ball bearings.

6. A friction clutch as defined in claim 4, wherein the roller bearings are single-row ball bearings.

7. A friction clutch as defined in claim 5, wherein the ball bearings have balls which are arranged in a ring-like manner, the two ball bearings being arranged substantially concentric to one another.

8. A friction clutch as defined in claim 5, wherein each of the components of the ramp arrangement is provided with a ball track of one of the ball bearings.

9. A friction clutch as defined in claim 5, wherein the two components of the ramp arrangement are elongate and axially configured so as to be directed away from the friction clutch, the cable and sheath being supported on the components outside of the clutch housing.

10. A friction clutch as defined in claim 2, wherein the two components of the ramp arrangement have two substantially washer-shaped areas arranged axially across from one another and having axial ramps, each of the washer-shaped areas being axially supported respectively by one of the roller bearings in approximately a common diameter area on the clutch housing and the operating means, both of the components having end regions radially inside the roller bearings formed as cylindrical tube continuation pieces located concentric to one another to facilitate mutual radial guidance, the continuation pieces being configured to extend out from the clutch housing, the cable and the sheath being connected to a portion of the continuation pieces outside the clutch housing.

11. A friction clutch as defined in claim 2, wherein the cable and sheath are swung substantially by 90° relative to the rotational axis and are run out of the disengagement means so as to be approximately tangential to the substantially cylindrical components.

12. A friction clutch as defined in claim 11, wherein the sheath and the cable are configured to absorb a drag moment of the roller bearings.

13. A friction clutch as defined in claim 1, wherein the spring means includes a diaphragm spring, and further comprising means for compensating at least for wear of friction covers of the clutch disk, the compensating means being located between the diaphragm spring and the pressure plate.

14. A friction clutch as defined in claim 13, and further comprising additional spring means for lowering disengagement force, the additional spring means being supported on an axially fixed component and on a component of an operating chain formed by the pressure plate and the disengagement means, the additional spring means being configured to be movable between an engaged state in which the spring means exercises no more an a slight lifting force and a disengaged state in which the spring means exercises a greater lifting force.

15. A friction clutch as defined in claim 14, wherein the additional spring means includes a diaphragm spring located between the spring means and the clutch housing so that an area of an external diameter of the diaphragm spring is supported on an inner side of the clutch housing and an area of an internal diameter of the diaphragm spring is supported on the operating means.

16. A friction clutch as defined in claim 15, wherein the diaphragm spring is one of a plate spring and a belleville spring.

17. A friction clutch as defined in claim 1, wherein the clutch housing is formed in a two-part manner that includes a first pot-shaped part having a radially external lip connected to the counterpressure plate, the pressure plate, the operating means and the spring means being arranged within the first part, the first part further having a bottom area with a central opening which is larger than a diameter area for application of the disengagement means on the operating means, the clutch housing further including a second pot-shaped part having a bottom area and a lip attached to the bottom area of the first part, the disengagement means being arranged within the second part so that the bottom area of the second part forms an axial force support for the disengagement means.

18. A friction clutch as defined in claim 17, and further comprising means for connecting the two housing parts so that the two housing parts are disconnectable.

19. A friction clutch as defined in claim 18, wherein the connection means includes a bayonet lock.

* * * * *